US012717349B2

(12) United States Patent
Kim et al.

(10) Patent No.: US 12,717,349 B2
(45) Date of Patent: Aug. 25, 2026

(54) GENERATION OF APPROACH AND LANDING TRAJECTORIES WITH OPERATIONAL CONSTRAINTS FOR AIRCRAFT WITH MULTIPLE DEGREES OF FREEDOM

(71) Applicant: University of Washington, Seattle, WA (US)

(72) Inventors: Taewan Kim, Seattle, WA (US); Niyousha Rahimi, Seattle, WA (US); Abhinav G. Kamath, Seattle, WA (US); Behcet Acikmese, Seattle, WA (US); Mehran Mesbahi, Seattle, WA (US)

(73) Assignee: University of Washington, Seattle, WA (US)

( * ) Notice: Subject to any disclaimer, the term of this patent is extended or adjusted under 35 U.S.C. 154(b) by 47 days.

(21) Appl. No.: 18/662,831

(22) Filed: May 13, 2024

(65) Prior Publication Data

US 2025/0348087 A1 Nov. 13, 2025

(51) Int. Cl.

*G05D 1/654* (2024.01)
*G05D 1/644* (2024.01)
*G05D 109/20* (2024.01)

(52) U.S. Cl.

CPC ........... *G05D 1/6545* (2024.01); *G05D 1/644* (2024.01); *G05D 2109/20* (2024.01)

(58) Field of Classification Search

CPC ... G05D 1/6545; G05D 1/644; G05D 2109/20
See application file for complete search history.

(56) References Cited

U.S. PATENT DOCUMENTS 6,718,236 B1 * 4/2004 Hammer .................. G08G 5/25 701/16
6,873,903 B2 * 3/2005 Baiada ..................... G08G 5/56 701/5

(Continued)

OTHER PUBLICATIONS

"Airplane Flying Handbook (FAA-H-8083-3A)", Available online at: https://citeseerx.ist.psu.edu/document?repid=rep1&type=pdf&doi=ac2be72d9e0424e35c7ae239180a601630057d1e, 2004, 278 pages.

(Continued)

*Primary Examiner* — Ramsey Refai
(74) *Attorney, Agent, or Firm* — Kilpatrick Townsend & Stockton LLP

(57) ABSTRACT

A system can include a processing device and a memory having instructions that are executable by the processing device for causing the processing device to perform operations. The operations may involve receiving or determine one or more operational constraints corresponding to an aircraft having multiple degrees of freedom. The operations may involve performing an optimization method to obtain a set of trajectory data for the aircraft subject to the one or more operational constraints, the set of trajectory data including a set of temporal state parameters that describe a state of the aircraft and a set of control input signals that are usable to control the aircraft. The operations may involve transmitting the set of trajectory data to a flight computer, the flight computer being configured to control the aircraft based on the set of trajectory data.

20 Claims, 5 Drawing Sheets

(56) References Cited

U.S. PATENT DOCUMENTS

| | | | | |
|---|---|---|---|---|
| 7,212,917 | B2 * | 5/2007 | Wilson, Jr. | G08G 5/26 340/961 |
| 7,286,077 | B2 * | 10/2007 | Falcati | G01S 19/15 701/16 |
| 8,050,780 | B2 * | 11/2011 | Tessier | B64C 13/503 318/568.17 |
| 9,442,490 | B2 * | 9/2016 | Mn | G05D 1/0676 |
| 9,688,417 | B2 * | 6/2017 | Labastie | G05D 1/0676 |
| 2003/0050746 | A1 * | 3/2003 | Baiada | G08G 5/56 701/4 |
| 2005/0080495 | A1 * | 4/2005 | Tessier | B64C 13/0421 700/63 |
| 2006/0025901 | A1 * | 2/2006 | Demortier | G05D 1/0676 701/16 |
| 2006/0095156 | A1 * | 5/2006 | Baiada | G06Q 30/00 700/213 |
| 2008/0262665 | A1 * | 10/2008 | Coulmeau | G05D 1/0676 701/16 |
| 2009/0043434 | A1 * | 2/2009 | Deker | G05D 1/0676 701/16 |
| 2009/0150011 | A1 * | 6/2009 | Villaume | G01C 23/00 701/3 |
| 2011/0208374 | A1 * | 8/2011 | Jayathirtha | G01C 23/005 701/4 |
| 2013/0085672 | A1 * | 4/2013 | Stewart | G08G 5/30 701/528 |

OTHER PUBLICATIONS

"Gurobi Optimizer Reference Manual", 2018, 1099 pages.

"Statistical Summary of Commercial Jet Airplane Accidents-Worldwide Operations 1959-2006", Available online at: http://www.boeing. com/news/techissues, Sep. 2023, 31 pages.

Acikmese et al., "Convex Programming Approach to Powered Descent Guidance for Mars Landing", Journal of Guidance, Control, and Dynamics, vol. 30, No. 5, Sep.-Oct. 2007, pp. 1353-1366.

Acikmese et al., "Flight Testing of Trajectories Computed by G-Fold: Fuel Optimal Large Divert Guidance Algorithm for Planetary Landing", American Astronautical Society/American Institute of Aeronautics and Astronautics Spaceflight Mechanics Meeting, Jan. 2013, pp. 1-14.

Betts et al., "Application of Direct Transcription to Commercial Aircraft Trajectory Optimization", Journal of Guidance, Control, and Dynamics, vol. 18, No. 1, Jan.-Feb. 1995, pp. 151-159.

Bittner et al., "A Multi-Model Gauss Pseudospectral Optimization Method for Aircraft Trajectories", American Institute of Aeronautics and Astronautics, Sep. 6, 2012, pp. 1-14.

Bock et al., "A Multiple Shooting Algorithm for Direct Solution of Optimal Control Problems", International Federation of Automatic Control Proceedings Volumes, vol. 17, No. 2, Jul. 1, 1984, pp. 1603-1608.

Bonalli et al., "GuSTO: Guaranteed Sequential Trajectory optimization via Sequential Convex Programming", Available online at: https://arxiv.org/pdf/1903.00155, Mar. 1, 2019, 10 pages.

Burrows , "Fuel-Optimal Aircraft Trajectories with Fixed Arrival Time", Journal of Guidance, Control, and Dynamics, vol. 6, No. 1, Jan.-Feb. 1983, pp. 14-19.

Chari et al., "Fast Monte Carlo Analysis for 6-DoF Powered-Descent Guidance via GPU-Accelerated Sequential Convex Programming", Available online at: https://arxiv.org/pdf/2404.18034, Apr. 28, 2024, pp. 1-16.

Delahaye et al., "Mathematical Models for Aircraft Trajectory Design: a Survey", Air Traffic Management and Systems, Available online at: https://enac.hal.science/hal-00913243/document, Jan. 10, 2014, 42 pages.

Desai et al., "Six-Degree-of-Freedom Trajectory Optimization Using a Two-Timescale Collocation Architecture", Journal of Guidance, Control, and Dynamics, vol. 31, No. 5, Sep.-Oct. 2008, pp. 1308-1315.

Diamond et al., "CVXPY: a Python-Embedded Modeling Language for Convex Optimization", Journal of Machine Learning Research, vol. 17, No. 83, Jun. 1, 2016, 7 pages.

Diehl et al., "Numerical Optimal Control", Optimization in Engineering Center (OPTEC), Jun. 1, 2011, 122 pages.

Dueri et al., "Trajectory Optimization with Inter-Sample Obstacle Avoidance via Successive Convexification", Available online at: https://Ieeexplore.ieee.org/document/8263811, Dec. 2017, 7 pages.

Elango et al., "Successive Convexification for Trajectory Optimization with Continuous-Time Constraint Satisfaction", Available online at: https://arxiv.org/pdf/2404.16826, Apr. 25, 2024, pp. 1-27.

Elango et al., "Trajectory Optimisation of Six Degree of Freedom Aircraft Using Differential Flatness", The Aeronautical Journal, vol. 122, No. 1257, Nov. 15, 2018, pp. 1788-1810.

Eren et al., "Model Predictive Control in Aerospace Systems: Current State and Opportunities", Journal of Guidance, Control, and Dynamics, vol. 40, No. 7, Jul. 2017, pp. 1541-1566.

Etkin , "Dynamics of Atmospheric Flight", Courier Corporation, Jun. 1, 1972, pp. 121-157.

Garone et al., "Reference and Command Governors for Systems with Constraints: a Survey on Theory and Applications", Automatica, vol. 75, Aug. 9, 2016, pp. 1-29.

Hagelauer et al., "A Soft Dynamic Programming Approach for on-line Aircraft 4D-Trajectory Optimization", European Journal of Operational Research, vol. 107, No. 1, Jul. 10, 2014, 8 pages.

Hong et al., "Adaptive Trajectory Generation Based on Real-Time Estimated Parameters for Impaired Aircraft Landing", International Journal of Systems Science, vol. 50, No. 15, Oct. 13, 2019, pp. 2733-2751.

Kamath et al., "Customized Real-Time First-Order Methods for Onboard Dual Quaternion-based 6-DoF Powered-Descent Guidance", Available online at: https://doi.org/10.2514/6.2023-2003, Jan. 19, 2023, pp. 1-29.

Kamath et al., "Real-Time Sequential Conic Optimization for Multi-Phase Rocket Landing Guidance", Available online at: https://arxiv.org/pdf/2212.00375, May 29, 2023, 8 pages.

Kato et al., "An Interpretation of Airplane General Motion and Contol as Inverse Problem", Journal of Guidance, Control, and Dynamics, vol. 9, No. 2, Mar. 1, 1986, pp. 198-204.

Kaya et al., "Computational Method for Time-Optimal Switching Control", Journal of Optimization Theory and Applications, vol. 117, Feb. 19, 2002, pp. 1-17.

Kelley , "Flight Path Optimization with Multiple Time Scales", Journal of Aircraft, vol. 8, No. 4, Apr. 1, 1971, pp. 238-240.

Khalil , "Nonlinear Control", Pearson New York, vol. 406, 2015, 400 pages.

Kim et al., "Optimization-Based Constrained Funnel Synthesis for Systems with Lipschitz Nonlinearities via Numerical Optimal Control", Available online at: https://arxiv.org/pdf/2303.10504, Jul. 1, 2023, 6 pages.

Kim et al., "Path Tracking for a Skid-steer Vehicle Using Model Predictive Control with on-line Sparse Gaussian Process", International Federation of Automatic Control-PapersOnLine, vol. 50, No. 1, Jul. 2017, pp. 5755-5760.

Koenemann et al., "Whole-Body Model-predictive Control Applied to the HRP-2 Humanoid", Institute of Electrical and Electronics Engineers/RSJ International Conference on Intelligent Robots and Systems (IROS), Sep. 2015, 8 pages.

Laad et al., "Fourier Pseudospectral Method for Trajectory Optimization with Stability Requirements", Journal of Guidance, Control, and Dynamics, vol. 43, No. 11, Nov. 2020, pp. 2073-2090.

Lin et al., "The Control Parameterization Method for Nonlinear Optimal Control: a Survey", Journal of Industrial and Management Optimization, vol. 10, No. 1, Jan. 1, 2014, pp. 275-309.

Liu et al., "Entry Trajectory Optimization by Second-Order Cone Programming", Journal of Guidance, Control, and Dynamics, vol. 39, No. 2, Aug. 14, 2015, pp. 1-35.

Loxton et al., "Optimal Control Problems with Multiple Characteristic Time Points in the Objective and Constraints", Automatica, vol. 44, No. 11, Dec. 5, 2010, pp. 2923-2929.

Lu et al., "Optimal Aircraft Terrain-Following Analysis and Trajectory Generation", Journal of guidance, Control, and Dynamics, vol. 18, No. 3, May-Jun. 1995, pp. 555-560.

(56) References Cited

OTHER PUBLICATIONS

Magni et al., "Robust Flight Control: a Design Challenge", Springer, vol. 110, Mar. 7, 1997.
Malyuta et al., "Convex Optimization for Trajectory Generation: a Tutorial on Generating Dynamically Feasible Trajectories Reliably and Efficiently", Available online at: https://par.nsf.gov/servlets/puri/10377628, Oct. 2022, pp. 40-113.
Malyuta et al., "Fast Homotopy for Spacecraft Rendezvous Trajectory Optimization with Discrete Logic", Journal of Guidance, Control, and Dynamics, vol. 46, No. 7, Jul. 14, 2021, pp. 1-40.
Malyuta et al., "Fast Trajectory Optimization via Successive Convexification for Spacecraft Rendezvous with Integer Constraints", Available online at: https://arxiv.org/pdf/1906.04857, Jun. 11, 2019, pp. 1-23.
Mceowen et al., "High-Accuracy 3-DoF Hypersonic Reentry Guidance via Sequential Convex Programming", Available online at: https://www.researchgate.net/profile/Skye-Mceowen/publication/367317812, Jan. 19, 2023, pp. 1-24.
Mceowen et al., "Hypersonic Entry Trajectory Optimization via Successive Convexification with Abstracted Control", Available online at: https://doi.org/10.2514/6.2022-0950, Jan. 2022, pp. 1-18.
Meng et al., "A Novel Trajectory Planning Strategy for Aircraft Emergency Landing Using Gauss Pseudospectral Methods", Control Theory and Technology, vol. 12, No. 4, Nov. 2014, pp. 393-401.
Miele , "Optimal Trajectories and Guidance Trajectories for Aircraft Flight Through Windshears", 29th Institute of Electrical and Electronics Engineers Conference on Decision and Control, Dec. 5, 1990, pp. 737-746.
Nesterov , "A Method for Solving the Convex Programming Problem with Convergence Rate O(1/k O(1/k^2)2)", Doklady Akademii Nauk, vol. 269, Russian Academy of Sciences, Jan. 1, 1983, pp. 543-547.
Quirynen et al., "Autogenerating Microsecond Solvers for Nonlinear MPC: a Tutorial Using ACADO Integrators", Optimal Control Applications and Methods, vol. 36, No. 5, Nov. 26, 2014, pp. 685-704.
Raivio et al., "Aircraft Trajectory Optimization Using Nonlinear Programming", System Modelling and Optimization, Jan. 1996, pp. 435-441.
Reynolds et al., "A Real-Time Algorithm for Non-Convex Powered Descent Guidance", Available online at: https://depts.washington.edu/uwrainlab/wordpress/wp-content/uploads/2020/01/AIAA_SciTech_2020.pdf, Jan. 5, 2020, pp. 1-24.
Reynolds et al., "Dual Quaternion-Based Powered Descent Guidance with State-Triggered Constraints", Available Online at: https://arxiv.org/pdf/1904.09248, Apr. 19, 2019, pp. 1-37.
Reynolds et al., "The Crawling Phenomenon in Sequential Convex Programming", Available online at: https://depts.washington.edu/uwrainlab/wordpress/wp-content/uploads/2020/01/ACC_2020.pdf, Jul. 2020, 7 pages.
Sandeepkumar et al., "Flatness-Based Reduced Hessian Method for Optimal Control of Aircraft", Journal of Guidance, Control, and Dynamics, vol. 45, No. 5, May 2022, pp. 921-934.
Sridhar et al., "Aircraft Trajectory Optimization and Contrails Avoidance in the Presence of Winds", Journal of Guidance, Control, and Dynamics, vol. 34, No. 5, Sep. 13, 2010, pp. 1-13.
Stevens et al., "Aircraft Control and Simulation: Dynamics, Controls Design, and Autonomous Systems", Oct. 7, 2015, 361 pages.
Szmuk et al., "Successive Convexification for Real-Time Six-Degree-of-Freedom Powered Descent Guidance with State-Triggered Constraints", Journal of Guidance, Control, and Dynamics, vol. 43, No. 8, Nov. 27, 2018, pp. 1-27.
Tassa et al., "Synthesis and Stabilization of Complex Behaviors Through Online Trajectory Optimization", Institute of Electrical and Electronics Engineers/RSJ International Conference on Intelligent Robots and Systems, Dec. 2012, 9 pages.
Teo et al., "A Simple Computational Procedure for Optimization Problems with Functional Inequality Constraints", Institute of Electrical and Electronics Engineers Transactions on Automatic Control, vol. 32, No. 10, Oct. 1987, pp. 940-941.
Teo et al., "Nonlinear Optimal Control Problems with Continuous State Inequality Constraints", Journal of Optimization Theory and Applications, vol. 63, No. 1, Oct. 1989, pp. 1-22.
Tsiotras et al., "Initial Guess Generation for Aircraft Landing Trajectory Optimization", American Institute of Aeronautics and Astronautics Guidance, Navigation, and Control Conference, Aug. 8, 2011, pp. 1-16.
Uzun et al., "Successive Convexification for Nonlinear Model Predictive Control with Continuous-Time Constraint Satisfaction", Available online at: https://arxiv.org/pdf/2405.00061, Apr. 26, 2024, 9 pages.
Vian et al., "Trajectory Optimization with Risk Minimization for Military Aircraft", Journal of Guidance, Control, and Dynamics, vol. 12, No. 3, May-Jun. 1989, pp. 311-317.
Williams et al., "Aggressive Driving with Model Predictive Path Integral Control", Institute of Electrical and Electronics Engineers International Conference on Robotics and Automation (ICRA), Available online at: https://drive.google.com/file/d/1tAgodZM6vSi_jemh-zMKOPSOfML9vx0r/view, May 2016, 8 pages.
Yang, "Proximal Gradient Method with Extrapolation and Line Search for a Class of Nonconvex and Nonsmooth Problems", Available online at: https://arxiv.org/pdf/1711.06831, Sep. 28, 2021, pp. 1-30.
Yu et al., "Extrapolated Proportional-Integral Projected Gradient Method for Conic Optimization", Available online at: https://arxiv.org/pdf/2203.04188, Jun. 24, 2022, 6 pages.
Zhao et al., "Analysis of Energy-Optimal Aircraft Landing Operation Trajectories", Journal of Guidance, Control, and Dynamics, vol. 36, No. 3, May-Jun. 2013, pp. 833-845.
Zhao et al., "Time-Optimal Parameterization of Geometric Path for Fixed-Wing Aircraft", Available online at: https://dcsl.gatech.edu/papers/infotech10a.pdf, Apr. 2010, pp. 1-21.
Zhao et al., "Time-Optimal Path Following for Fixed-Wing Aircraft", Journal of Guidance, Control, and Dynamics, vol. 36, No. 1, Jan. 30, 2013, pp. 83-95.

* cited by examiner

GENERATION OF APPROACH AND LANDING TRAJECTORIES WITH OPERATIONAL CONSTRAINTS FOR AIRCRAFT WITH MULTIPLE DEGREES OF FREEDOM

BACKGROUND

Approach and landing trajectories for an aircraft may be generated using any number of conventional approaches. Generating these trajectories can enable an operator of the aircraft or a computer associated with the aircraft to provide the aircraft with instructions to safely land the aircraft. Conventional trajectory generation approaches may produce trajectories that are unrealistic considering physical limitations of aircrafts and conditions present in a landing environment.

BRIEF SUMMARY

A system can include a processing device and a memory having instructions that are executable by the processing device for causing the processing device to perform operations. The operations may involve receiving or determine one or more operational constraints corresponding to an aircraft having at least six degrees of freedom. In some examples, the aircraft may have fewer than six degrees of freedom. For example, the operations described herein may be applicable to aircraft models having three degrees of freedom, two degrees of freedom, and the like. The operations may involve performing an optimization method to obtain a set of trajectory data for the aircraft subject to the one or more operational constraints, the set of trajectory data including a set of temporal state parameters that describe a state of the aircraft and a set of control input signals that are usable to control the aircraft. The operations may involve transmitting the set of trajectory data to a flight computer, the flight computer being configured to control the aircraft based on the set of trajectory data.

In some examples, the optimization method can involve formulating an optimal control problem for the aircraft, converting the optimal control problem into one or more convex sub-problems, and solving the one or more convex sub-problems to determine the set of trajectory data. The set of temporal state parameters can include at least one of: a position of the aircraft, a velocity of the aircraft, one or more Euler angles associated with an angular orientation of the aircraft, an angular velocity of the aircraft, or an actual thrust associated with the aircraft. The set of control input signals can include at least one of an aileron command, an elevator command, a rudder command, a thrust command associated with the aircraft.

In some examples, the optimization method comprises a sequential convex programming (SCP) method, such as an extrapolated penalized trust region (xPTR) method. The system of claim 1, wherein the one or more operational constraints may include one or more state-triggered constraints that may be enforced based on the set of temporal state parameters.

A computer-implemented method can involve receiving or determining one or more operational constraints corresponding to an aircraft having at least six degrees of freedom. The method can involve performing an optimization method to obtain a set of trajectory data for the aircraft subject to the one or more operational constraints, wherein the set of trajectory data includes a set of temporal state parameters that describe a state of the aircraft and a set of control input signals that are usable to control the aircraft. The method can involve transmitting the set of trajectory data to a flight computer that is configured to control the aircraft based on the set of trajectory data.

The method can involve accessing a set of modeled dynamics for the aircraft. The one or more operational constraints can include the set of modeled dynamics for the aircraft. The one or more operational constraints can include a runway alignment constraint. The one or more operational constraints can include an obstacle avoidance constraint. The one or more operational constraints can include a continuous time constraint that may prevent inter-sample constraint violations. The one or more operational constraints can include one or more limits on the set of control input signals.

A non-transitory computer-readable medium may have instructions that are executable by a processing device for causing the processing device to receive one or more operational constraints corresponding to an aircraft having at least six degrees of freedom. The instructions may be executable to perform an optimization method to obtain a set of trajectory data for the aircraft subject to the one or more operational constraints, wherein the set of trajectory data includes a set of temporal state parameters that describe a state of the aircraft and a set of control input signals that are usable to control the aircraft. The instructions may be executable to transmit the set of trajectory data to a flight computer, the flight computer being configured to control the aircraft based on the set of trajectory data. In some examples, the instructions are further executable by the processing device to determine the one or more operational constraints based a six degree-of-freedom computational model of the aircraft.

DETAILED DESCRIPTION

Figure 1:
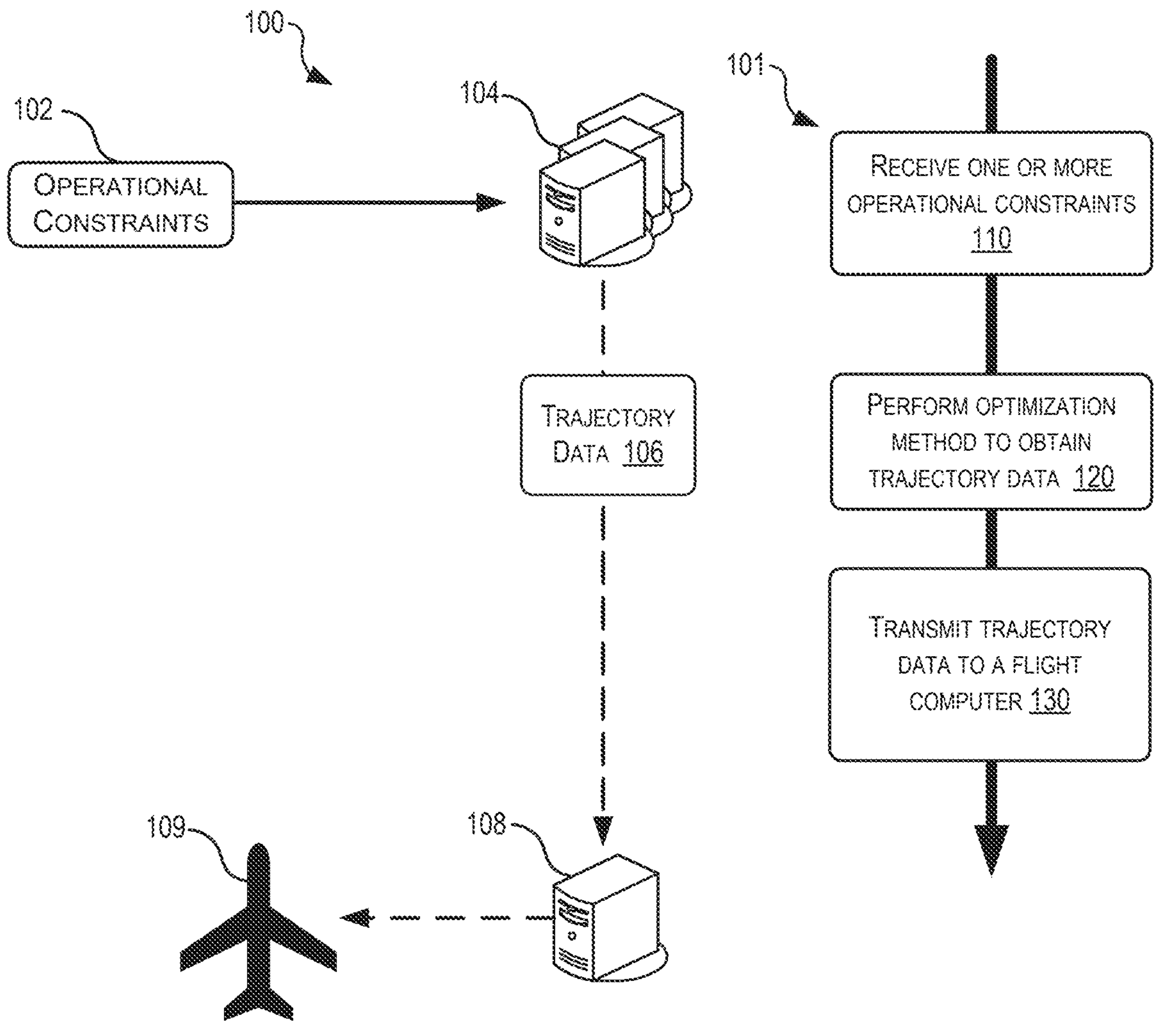
FIG. 1 is a high-level diagram of a system and process for generating trajectory data for an aircraft having six degrees of freedom according to certain aspects of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Generating approach and landing trajectories for aircraft with multiple degrees of freedom (M-DoF) (e.g., a twodegree-of-freedom (2-Dof), three-degree-of-freedom (3-DoF), six-degree-of-freedom (6-DoF), etc.) can be challenging. First, trajectory generation problems are typically expressed as continuous-time (and infinite-dimensional) optimal control problem over function spaces, possibly having no analytical solutions. Second, trajectory generation problems for M-DoFaircraft can involve complex high-dimensional aircraft dynamics that can involve nonlinear aerodynamic effects. Third, it has been difficult to ensure that generated trajectories are realistic.

The techniques described herein address various issues with conventional trajectory generation methods. Certain aspects of the present disclosure can involve a computer-implemented method of formulating the aircraft approach and landing trajectory optimization problem and generating dynamically feasible trajectories and implementing an optimization method, such as sequential convex programming (SCP), to solve the formulated problem. To properly formulate the problem, a computing device can first model the M-DoF aircraft dynamics using a research civil aircraft model (RCAM) or any other suitable M-DoFmodel and then impose the modeled dynamics as a constraint to generate dynamically feasible trajectories. This can ensure that the trajectories are physically possible to attain by preventing trajectories that violate the aircraft's equation of motion from being generated.

The techniques described herein also include a runway alignment constraint that requires the aircraft to be kept aligned with a runway centerline once the aircraft enters the final approach phase. The runway alignment constraint is useful to generate realistic trajectories for aircraft approach and landing in order to follow standard landing procedures and to reduce possible safety risks. To impose the runway alignment constraint, the computing device can incorporate a multi-phase trajectory planning scheme that separates the entire flight into two phases: the base leg and the final approach. Then, the alignment constraint may be imposed for the final approach phase, while preserving the convexity of the constraint and enabling exact temporal triggering. The method may involve state-triggered constraints (STCs) that are dynamically enforced. For example, the runway alignment condition may only be enforced when the altitude of the aircraft is less than a user-specified value, resulting in a nonconvex constraint. Further, the computing device can implement an extrapolated penalized trust region method (xPTR) that adopts and extends a penalized trust-region (PTR) method by employing an extrapolation update.

Techniques described herein improve the functioning of computing devices that compute trajectories, while also providing trajectories that are more realistic, reliable, and safe. The techniques constitute a technical improvement because using the additional constraints described herein enable the optimization problem to converge quicker and more reliably than conventional approaches, thereby conserving computing resources, memory resources, bandwidth resources, and the like. In addition, the techniques described herein constitute a practical application of the claimed subject matter in the form of computing trajectories that are used to control real-world aircraft. For example, the output from the optimization method may include parameters that can be used by an aircraft to control multiple different control functions of the aircraft.

Turning now to figures, FIG. 1 is a high-level diagram of a system 100 and process 101 for generating trajectory data for an aircraft having six degrees of freedom according to certain aspects of the present disclosure. A computing device 104 may perform the process 101.

Figure 3:
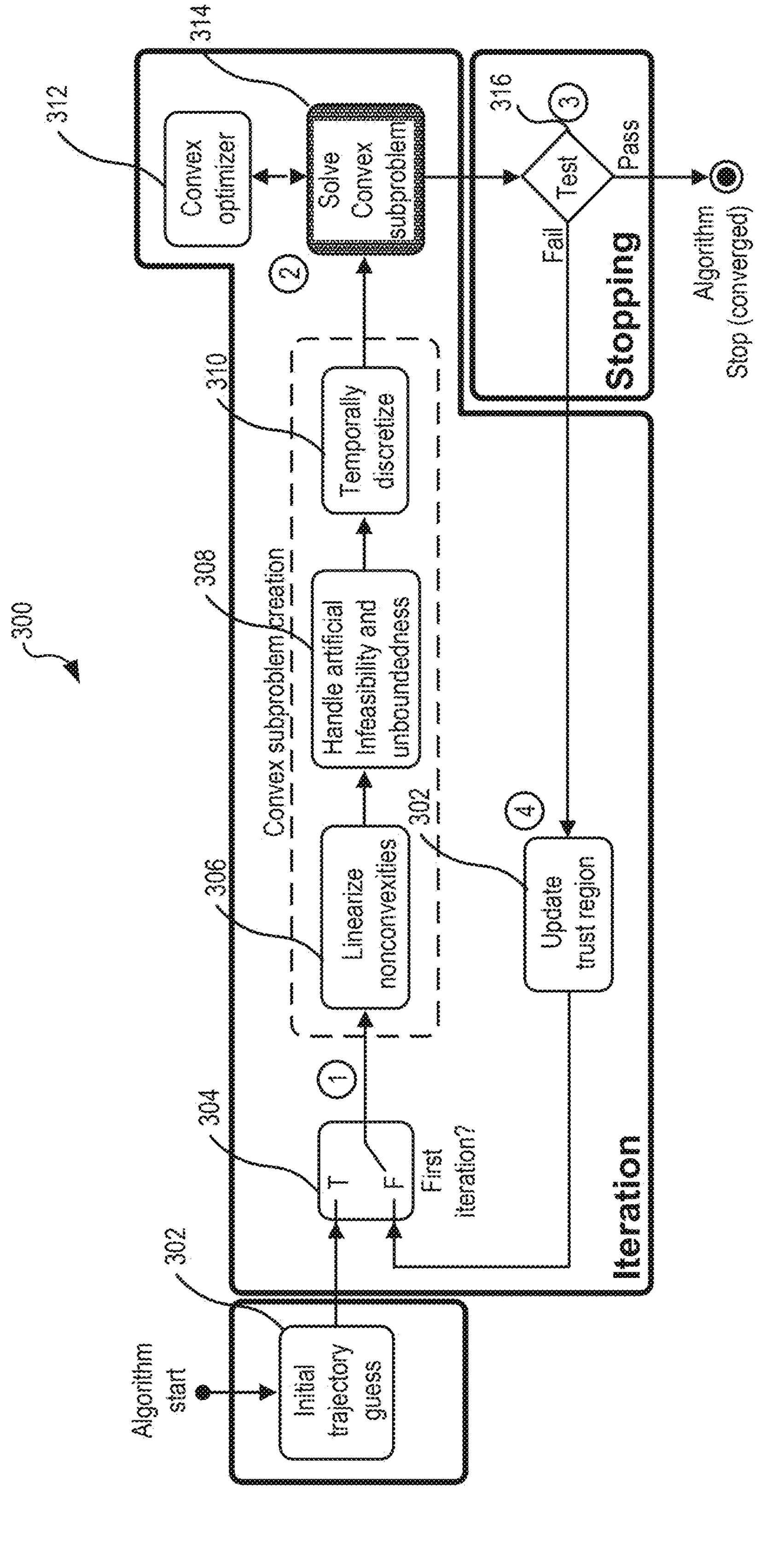
FIG. 3 is a sequential convex programming optimization method that can be used for generating trajectory data for an aircraft having six degrees of freedom according to certain aspects of the present disclosure.
Figure 4:
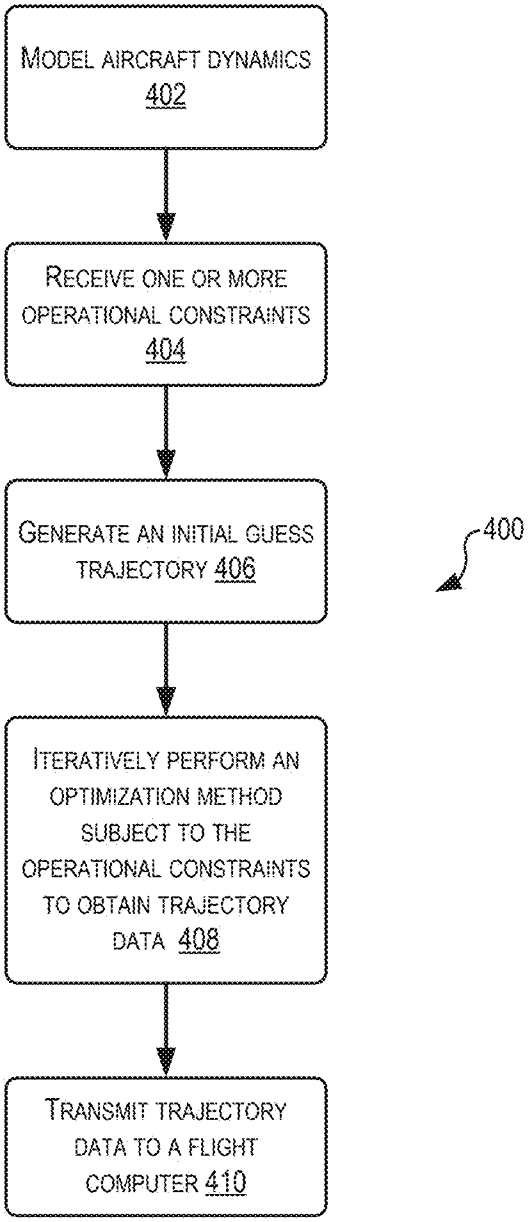
FIG. 4 is a flow diagram of a process for generating trajectory data for an aircraft having six degrees of freedom according to certain aspects of the present disclosure.

FIGS. 1, 3, and 4 illustrate example flow diagrams showing processes 101, 300 and 400, according to at least a few examples. These processes, and any other processes described herein, are illustrated as logical flow diagrams, each operation of which represents a sequence of operations that can be implemented in hardware, computer instructions, or a combination thereof. In the context of computer instructions, the operations may represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes described herein may be performed under the control of one or more computer systems configured with specific executable instructions and may be implemented as code (e.g., executable instructions, one or more computer programs, or one or more applications) executing collectively on one or more processors, by hardware, or combinations thereof. As noted above, the code may be stored on a non-transitory computer readable storage medium, for example, in the form of a computer program including a plurality of instructions executable by one or more processors.

As noted above, the computing device 104 that is tasked with generating trajectory data 106 for an aircraft 109 can receive one or more operational constraints 102, as shown in block 110 of the process 101. The operational constraints 102 can define limitations both on the state and on the control of the aircraft 109. The aircraft 109 may have six degrees of freedom-that is, the aircraft 109 may include forward, lateral, and vertical thrust in addition to the conventional pitch, yaw, and roll degrees of freedom. In some examples, the computing device 104 can be housed separately from the aircraft 109. Alternatively, the computing device 104 can be onboard the aircraft 109 or may be communicatively coupled with systems onboard the aircraft 109. In some examples, the computing device 104 may be tasked with determining or generating the operational constraints 102. The operational constraints 102 may include, but are not limited to, a set of modeled dynamics for the aircraft, a runway alignment constraint, an obstacle avoidance constraint, limits on the control input signals, and a continuous time constraint that can prevent inter-sample constraint violations. In some examples, the continuous time constraint may be linearized. In some examples, the computing device 104 may generate an initial guess trajectory prior to performing optimization. For example, the computing device 104 may implement a conventional trajectory generation algorithm to create a smooth curvilinear path between a takeoff location and landing location as a reference trajectory. The reference trajectory may not satisfy the operational constraints 102 and may be adjusted to do so.

The computing device 104 can perform an optimization method subject to the operational constraints 102 to generate a set of trajectory data 106, as shown as block 120. The trajectory data 106 can include a set of temporal state parameters that describe a state of the aircraft 109 and a set of control input signals for the aircraft 108. The trajectory data 106 may also include time-relevant information, such as a length of time between each temporal state parameter value. For example, the temporal state parameters may include a position associated with the aircraft 109, a velocity associated with the aircraft 109, one or more Euler angles associated with the aircraft 109, an angular velocity of the aircraft 109, a thrust associated with the aircraft 109 and any other relevant temporal state parameters that are usable to determine the state of the aircraft 109. The control input signals may include commands that can be issued to the aircraft 109 by an onboard flight computer. For example, the control input signals can include an aileron command, an elevator command, a rudder command, a thrust command, or any other suitable command that can be issued by the flight computer to control the aircraft 109.

In some examples, the computing device 104 may iteratively perform the optimization method on an initial guess trajectory to generate the trajectory data 106, thereby adjusting the initial guess trajectory and ensuring that the resulting trajectory data 106 complies with the operational constraints 102. The optimization method may be a sequential convex programming method, such as an extrapolated penalized trust region (xPTR) method. For example, the optimization method may involve converting a nonconvex optimal control problem for the aircraft 109 into solvable convex sub-problems, then solving the convex sub-problems to generate the trajectory data 106.

Once the computing device 104 has generated the trajectory data 106, the computing device 104 can transmit the trajectory data 106 to a flight computer 108 that can control the aircraft 109, as shown in block 130. This can be done wirelessly (e.g., via Bluetooth or Wi-Fi), or through a wired connection (e.g., through a serial bus.) The flight computer 108 can ingest the trajectory data 106 and issue commands to the aircraft 109 based on the trajectory data 106.

Figure 2:
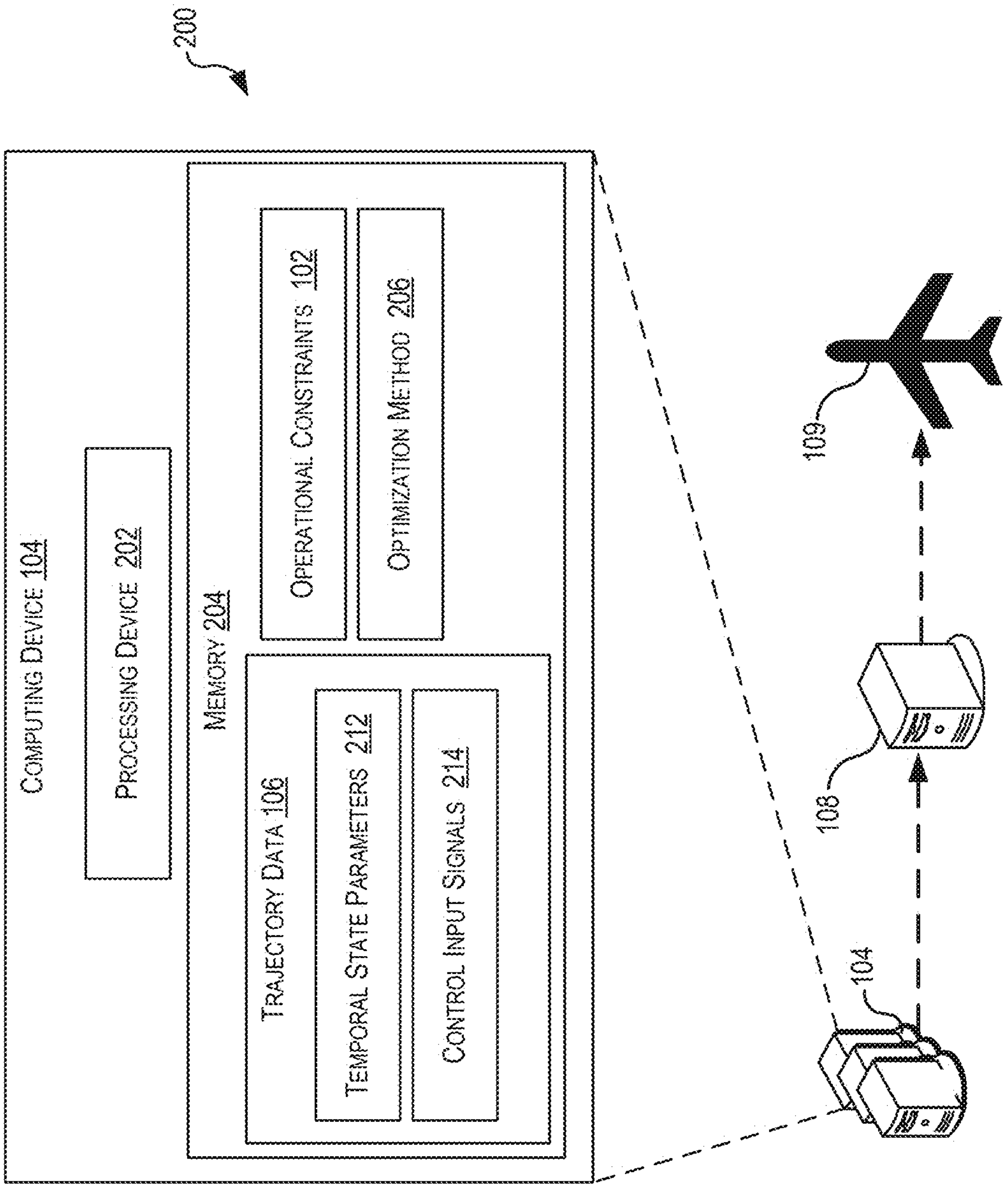
FIG. 2 is a block diagram of a system for generating trajectory data for an aircraft having six degrees of freedom according to certain aspects of the present disclosure.

FIG. 2 is a block diagram of a system 200 for generating trajectory data 106 for an aircraft 109 having six degrees of freedom according to certain aspects of the present disclosure.

The system 200 includes the computing device 104, which can include a processing device 202 and a memory 204. The processing device 202 may include one or more processors. The processing device 202 can fetch and execute instructions in the memory 204. In some examples, the computing device 104 may be a server or a personal computer that is separate from the aircraft 109. In other examples, the computing device 104 may be situated onboard the aircraft 109 and communicatively coupled with a flight computer 108 associated therewith. The computing device 104 may be implemented using a cloud computing platform or other suitable server system.

The computing device 104 can generate the trajectory data 106 for an aircraft 109 having six degrees of freedom. For example, the computing device 104 can perform an optimization method 206 subject to the operational constraints 102 to generate the trajectory data 106. In some examples, the computing device 104 can generate the trajectory data 106 for aircraft approach and landing maneuvers within a range of about 70 kilometers from the final landing site, with a corresponding flight horizon of about 10 minutes. In other examples, the computing device 104 may generate the trajectory data 106 at a range greater than or less than 70 kilometer and/or with a corresponding flight horizon of less than or greater than 10 minutes. Prior to generating the trajectory data, the computing device 104 can model the dynamics of the aircraft 109. In cases where the flight horizon and the distance are not too large (e.g., with a range of 100 or fewer kilometers, and a time horizon of 15 minutes or fewer), the computing device 104 can make several simplifying assumptions to simplify the complexity of one or more control problems associated with the aircraft 109. In some examples, the computing device 104 may assume that the effect of planetary rotation of the earth is negligible, that the atmosphere is a relatively stationary atmosphere with constant air density, a flat non-rotating earth model, and a uniform gravitational field for the derivation of the aircraft dynamics. In some examples, the computing device 104 may assume a constant wind field without wind shear and a rigid-body aircraft model to simplify the system dynamics when formulating an optimal control problem for the aircraft 109.

The following nomenclature is applicable to the description below.

m=aircraft mass v, $\dot{v}$v=aircraft velocity vector and time-derivative of velocity vector Ω, $\dot{\Omega}$Ω=angular velocity vector and time-derivative of angular velocity vector $F_e$, $F_a$, $F_g$=engine force, aerodynamic force, and gravity force p, q, r=components of angular velocity along the x-, y-, and z-axes, respectively V=magnitude of aircraft velocity (speed)

ϕ, θ, Ψ=roll, pitch, and yaw angles $$A_I^B, A_B^I$$

rotation matrices between inertial frame and the body-fixed frame $p_N$, $p_E$, $p_D$, p=north, east, and down components of position, and the position vector J=moment of inertia matrix Me, Ma=engine moment, aerodynamic moment $v_a$=magnitude of airspeed α, β=angle of attack and sideslip angle $C_L$, $C_D$, $C_Y$=coefficients of lift, drag, and sideforce $C_{Lwb}$, $C_{Lt}$=lift coefficients acting on wing and body, and tail $C_{L\alpha}$, $C_{L\alpha t}$, $C_{LqV}$=stability derivatives for lift S, $S_t$=platform area for the tail and the wing $\alpha_t$=angle of attack at the tail ϵ, $\epsilon_\alpha$=downwash angle and slope constant for downwash angle lt=longitudinal distance between aerodynamic center of tailplane and that of wing and body $C_D0$, $C_D1$, $C_D2$, $C_D\alpha$,=stability derivatives for drag $C_{Y\beta}$, $C_Y$ δR=stability derivative and control derivative for sideforce $\bar{c}$=mean aerodynamic chord $C_{l\beta}$, $C_{lp}$, $C_{lr}$=stability derivatives for rolling moment $C_{l\delta A}$, $C_{l\delta R}$=control derivatives for rolling moment $C_{m0}$, $C_{m\alpha}$, $C_{mq}$=stability derivatives for pitching moment $C_{m\delta E}$=control derivatives for pitching moment Cnβ, $Cn_{\alpha\beta}$, $C_{np}$, $C_{nr}$=stability derivatives for yawing moment CnδA, CnδR=control derivatives for yawing moment L, D, Y=lift, drag, and sideforce $\bar{q}$=dynamic pressure ρ=air density $\overline{L}$, $\overline{ML}$, $\overline{M}$,$\overline{YY}$=rolling, pitching, and yawing moments pcg, $p_{ac}$, $P_T$=positions of center of gravity, aerodynamic center, and engine $\delta_A$, $\delta_E$, $\delta_R$=commands for aileron, elevator, rudder $\delta_T$, $\eta_T$=thrust command and actual thrust command Subscripts I=the north-east-down frame (inertial frame)

$\mathcal{B}$ =the aircraft-body frame (body-fixed frame)

k=discrete time index Notation $\mathbb{R}$, $\mathbb{R}_{+}$, $\mathbb{R}_{++}$, $\mathbb{Z}$=sets of real, nonnegative real, and positive real numbers, and integers $R^n$=n-dimensional Euclidean space $$N_q^r$$

=a finite set of consecutive non-negative integers {q, q+1, . . . , r} x=outer product operation

≤=component-wise inequality $I_n$=n×m identity matrix $0_{n \times m}$=n×m matrix of zeros $\|\cdot\|_2$=vector 2 norm (a, b, c)=stacked vector of a, b, c, that is, $[a^T, {}_b^T, {}_c^T]^T$ The computing device 104 may generate a 6-DoF aircraft model that can be expressed in state-space form as follows:

$$\dot{x}(t) = f(x(t), u(t)), \tag{7}$$

The computing device 104 may generate the trajectory data 106 in accordance with the 6-DoF aircraft model. The trajectory data 106 can include temporal state parameters 212 and control input signals 214. In some examples, the temporal state parameters 212 may be expressed as a state vector $x(\cdot) \in \mathbb{R}^{13}$ and a control input vector $u(\cdot) \in \mathbb{R}^4$ that may be given by:

$$x = [p, {}^T v^T, \Phi^T, \Omega^T, \delta_T]T,$$

$$u = [\delta_A, \delta_E, \delta_R, \eta_T]T.$$

The computing device 104 may impose certain operational constraints 102 on the aircraft 109. For example, the computing device 104 may require that the altitude of the aircraft is positive at all times in a given set of trajectory data 106 to prohibit the aircraft from colliding with the ground. The altitude constraint can be written as:

$$-pD \geq 0. \tag{8}$$

In some examples, the computing device 104 may impose operational constraints 106 on the minimum and maximum velocity constraints, which may be given by:

$$v_{min} \leq v \leq v_{max}, \tag{9}$$

where the vectors $v_{min}$, $v_{max} \in \mathbb{R}^3$ are the component-wise minimum and maximum velocity. The Euler angles and the angular velocities have the following constraints:

$$\phi_{min} \leq \phi \leq \phi_{max},\ \theta_{min} \leq \theta \leq \theta_{max},\ \Omega_{min} \leq \Omega \leq \Omega_{max}, \tag{10}$$

where $\phi_{min}$, $\theta_{min} \in \mathbb{R}$, and $\Omega_{min} \in \mathbb{R}^3$ are the minimum allowable roll angle, pitch angle, and angular velocity, respectively, and $\phi_{max}$, $\theta_{max} \in \mathbb{R}$, and $\Omega_{max} \in \mathbb{R}^3$ are the maximum allowable roll angle, pitch angle, and angular velocity, respectively. To prevent the wings from stalling and having a negative lift force, we impose the upper and lower bounds on the angle of attack as follows:

$$\alpha_{min} \leq \alpha \leq \alpha_{max},$$

where $$\alpha_{min}, \alpha_{max} \in \left[-\frac{\pi}{2}, \frac{\pi}{2}\right].$$

These constraints are equivalent to $$u_a \tan\alpha_{min} \leq w_a \leq u_a \tan\alpha_{max}, \tag{11}$$

The computing device 104 can impose the following box constraint on the input u:

$$u_{min} \leq u \leq u_{max}, \tag{12}$$

where umin, umax∈R4 are the minimum and maximum allowable control inputs, respectively. The computing device 104 can impose the following constraints on the thrust:

$$\delta_{T,min} \leq \delta_T \leq \delta_{T,max}, \tag{13a}$$

$$\dot{\delta}_{min} \leq \frac{1}{\tau T}(\eta_T - \delta_T) \leq \dot{\delta}_{max}, \tag{13B}$$

where δT, min∈R and δT, max∈R may be defined as the minimum and maximum throttle, respectively, and δ¤min∈R and δ¤max∈R are the minimum and maximum throttle rates, respectively. The initial conditions can be given by:

$$p(t_0) = p_i,\ v(t_0) = v_i \tag{14b}$$

$$\phi(t_0) = p_i,\ \phi(t_0) = v_i \tag{14b}$$

where t0∈R+ is the start time, and pi∈R3, vi∈R3, Φi∈R3, and Ωi∈R3 are the initial position, velocity, Euler angles, and angular velocity, respectively. The terminal boundary conditions are given by:

$$p_i(t_f) = 0_{3\times1},\ |v(t_f)| \leq v_f, \tag{15a}$$

$$\phi(t_f) = 0_{3\times1},\ \Omega(t_f) = 0_{3\times1}, \tag{15b}$$

where tf∈R++ is the final time. The final position at which the aircraft touches down may be set to the origin of inertial frame I. The airspeed v at the final time should be less than vf∈R3+ component-wise to make sure that the velocity of the aircraft on the runway is not too large.

As the aircraft descends towards the touch down point, the aircraft may align with the runway in order to prevent an approach that is either too steep or too shallow for passenger comfort. This alignment constraint can be described using simple linear constraints that ensure that the position of the aircraft is aligned with the runway during the final approach phase. One additional consideration is that the switching time, which determines when the alignment constraint is activated and when the final approach phase starts, may need to be optimized alongside the entire trajectory. Hence, this constraint differs from pointwise state and input constraints that are enforced at all times during the entire flight.

The runway alignment constraint with the switching time ts can be mathematically stated as:

$$\exists\, t_s \in [t_0, t_f] \text{ such that} - p_D(t) \le h_c \text{ and } c(p(t)) \le 0, \forall_t \in [t_s, t_f] \tag{16}$$

where $h_c \in \mathbb{R}_{++}$ is the user-specified altitude. The alignment constraint function c: $\mathbb{R}^3 \rightarrow \mathbb{R}^4$ is defined as:

$$\begin{bmatrix} -p_E + p_N \tan\theta_{lat}^{max} \\ p_E + p_N \tan\theta_{lat}^{min} \\ -p_D + p_N \tan\theta_{ver}^{max} \\ p_D + p_N \tan\theta_{ver}^{min} \end{bmatrix} \le 0,$$

where angles $$\theta_{lat}, \theta_{ver} \in \left[-\frac{\pi}{2}, \frac{\pi}{2}\right]$$

are $$\theta_{lat} = \tan^{-1}\left(\frac{-p_E}{-p_N}\right), \theta_{ver} = \tan^{-1}\left(\frac{-p_D}{-p_N}\right), \tag{18}$$

representing the angles between the runway and the projected positions of the aircraft onto the xy-plane and the xz-plane, respectively, in the inertial frame. The parameters $$\theta_{lat}^{min}, \theta_{ver}^{min} \in \mathbb{R} \text{ and } \theta_{lat}^{max}, \theta_{ver}^{max} \in \mathbb{R}$$

are the minimum and maximum values of $\theta_{lat}$ and $\theta_{ver}$, respectively.

The alignment constraint in (16) showcases an instance of existential quantification in the form of "there exists a time $$t_s''.$$

The existential quantifier can complicate the optimization problem since it does not specify a precise switching time $t_s$, but instead it indicates that such a time $t_s$ exists within the given interval $t_0$, $t_f$. In the next section, we discuss how this constraint can be incorporated into our SCP framework by using time-interval dilation variables. An alternative way to express the runway alignment constraint is to utilize the state-triggered constraint (STC) formulation. The alignment constraint can then be given as the following logical statement:

$$\text{if } -P_D < h_c, \text{ then } c(p) \le 0. \tag{19}$$

As a consequence of STC (19), if the aircraft satisfies a trigger condition that is −pD<hc, the aircraft should align with the runway by satisfying the condition c(p)≤0. On the other hand, if the trigger condition is not activated, which means the altitude is greater than hc, the alignment condition is not necessarily satisfied. The alignment constraint given by STC (19) is not equivalent to (16). As an example, having both −pD<hc and c(p)>0 before the switch time ts does not violate the original condition (16), whereas the same condition violates (19). Hence, the alignment constraint in the STC form is conservative. However, if it is assumed that the height of the altitude is monotonically decreasing, the two conditions (16) and (19) are equivalent.

One way to impose the STC (19) is to use a min function as follows:

$$g(p) := -\min(-p_D - h_c, 0)\, c(p) \le 0, \tag{20}$$

where the function $_g$: $\mathbb{R}^3 \rightarrow \mathbb{R}^4$ is introduced to compactly denote the constraint. One can find that the condition (20) is equivalent to the original STC condition (19).

The computing device 104 can implement obstacle avoidance by imposing additional constraints. The obstacles could be other aircraft or areas where the weather is so severe that it could be detrimental to flight safety, for example. The obstacles can be modeled as three-dimensional ellipsoids, and the obstacle avoidance constraints can be written as $$1 - \|H_i(p(t) - r_j\|2 \le 0, \forall\, i \in N_1^{\pi_{abs}}, \forall\, t \in [t_0, t_f],$$

where Hi∈R3×3 is the shape matrix for the ellipse, ri∈R3 is the center of the ellipse, nobs∈Z is the number of obstacles, where subscript i represents the index of the obstacle under consideration.

The computing device 104 can use two performance indices to evaluate the quality of trajectory data: minimum-time and minimum-thrust. The cost function for each index can be formally written as:

$$J_{time} = t_f, J_{thr} = \int_{t_0}^{t_f} \eta_T^2(t)dt, \tag{22}$$

The computing device 104 may levy a penalty on the rate of the control input commands δA, δE, and δR to ensure that the resulting control input profiles are smooth. The cost function for this penalty is given as $$J_r = \int_{t_0}^{t_f} \dot{\delta}_A(t)^2 + \dot{\delta}_E(t)^2 + \dot{\delta}_R(t)^2 dt \tag{23}$$

The computing device 104 may penalize the angular velocity to prohibit rapid changes in the attitude of the aircraft. The corresponding cost function is given as $$J_\Omega = \int_{t_0}^{t_f} p(t)^2 + q(t)^2 + r(t)^2 dt \tag{24}$$

Also, the computing device 104 may penalize the angular velocity to prohibit rapid changes in the attitude of the aircraft. Hence, the objective function for the aircraft landing problem can be given by:

$$J = w_t J_{time} + w_{thr} J_{thr} + w_r J_r + w_\Omega J_\Omega \tag{25}$$

where wt, wthr, wr, wΩ∈R are the weighting factors for the final time, the thrust, the rate of the control input commands, and the angular velocity, respectively.

Trajectories computed without the runway alignment constraint may either be too steep or too shallow during the final landing phase, neither of which are reasonable in practice. The cost function values for the cases without the alignment constraint are smaller on average than those for the cases with the alignment constraint. This is expected since a trajectory with fewer constraints can be expected to have a lower cost.

To accomplish approach and landing in the presence of crosswinds, some sets of trajectory data can employ the crab method and the wing-low method. For example, under the left crosswind condition, the aircraft initially shifts to the east side slightly due to the left wind, and then maintains a negative yaw angle that makes a heading toward the wind to make the ground velocity vg aligned with and forward to the runway. This discrepancy between the aircraft's longitudinal direction and the direction of its ground velocity gives the appearance that the aircraft is performing a crabbing maneuver. Furthermore, once the aircraft gets closer to the runway during the final approach, the aircraft lowers the upwind wing (left wing), resulting in a negative roll angle. This wing-low method helps keep the aircraft's heading aligned with the runway under the crosswind condition, so that the aircraft can satisfy the zero-yaw angle condition at touch down.

FIG. 3 is a sequential convex programming optimization method that can be used for generating trajectory data for an aircraft having six degrees of freedom according to certain aspects of the present disclosure.

The computing device 104 may implement an SCP-based optimization method such as the optimization method 300 to solve a free-final-time continuous-time nonconvex optimal control problem. The SCP optimization method 300 can sequentially construct fixed-final-time discrete-time convex subproblems that approximate the original problem. The optimization method 300 involves iteratively solving these subproblems until it converges to a solution, wherein the nonconvex constraints at the current iteration are linearized about the solution from the previous iteration. The xPTR optimization method 300 employs multiple shooting discretization, in which the continuous-time input signal is represented by a finite number of parameters. Further, a time scaling transformation known as time-interval dilation is adopted. With discretization and dilation, it becomes possible to convert the free-final-time continuous-time problem into a fixed-final-time discrete-time problem. Then, to construct the convex subproblems approximating the original nonconvex problem, all nonconvex constraints including the system dynamics are linearized around the solution to the previous subproblem, i.e., around the reference trajectory, as shown in block 306. Given the solution to this convex subproblem, the optimization method 300 performs an extrapolation to update the reference trajectory. The entire procedure is repeated until convergence, at which the solution is dynamically feasible, i.e., the nonlinear dynamics are exactly satisfied up to integration tolerances.

To numerically solve a continuous-time optimal control problem, the computing device 104 may perform multiple-shooting discretization, as shown in block 310. That is, the computing device 104 may parameterize the control input, choose a time mesh, and define the state and input nodes as follows:

$$t_0 < t_1 < \ldots < t_k < \ldots < t_N = t_f,\ \forall\, k \in N_0^N,$$
$$x_k := x(t_k),\ u_k := u(t_k),$$

where N∈R+ is the number of subintervals. Then, the control input signal u(·) may be parameterized using a first-order hold (FOH) (piecewise continuous and affine) interpolation between successive input nodes as follows:

$$u(t) = \lambda_k^m(t)u_k + \lambda_k^m(t)u_{k+1},\ \forall\, t \in [t_k, t_{k+1}] \tag{26a}$$

$$\lambda_k^m(t) = \frac{t_{k+1} - t}{t_{k+1} - t_k},\ \lambda_k^p(t) = \frac{t - t_k}{t_{k+1} - t_k}, \tag{26b}$$

Then, the state signal x(·) in each subinterval is given by the solution to the following equation:

$$x(t) = x_k + \int_{t_k}^{t} f(x(t), u(t))dt,\ \forall\, t \in [t_k, t_{k+1}). \tag{27}$$

The computing device 104 may determine a continuous-time state trajectory $_x(t)$ for each subinterval t∈$[t_k, t_{k+1})$ is computed by solving (27) from the point $x_k$ at $t=t_k$ with the input signal $_u(t)$ in (26), and then this computation is restarted at each discrete temporal node $x_k$. The original optimal control problem in II.H is a free-final-time problem, i.e., the time of flight $t_f$ is a decision variable and not a fixed constant. To convert it into an equivalent fixed-final-time problem, we introduce a time scaling variable $\tau^k \in [0, 1]$ that has a bijective mapping with the original time variable t∈$[t_k, t_{k+1})$ as follows:

$$t = s_k\tau^k + t_k t = s_k\tau^k + t_k \tag{28}$$

The expression sk may be a time-interval dilation variable that can be defined as the length of the subinterval sk B tk+1−tk. With the conversion expressed in equation 28, the time-scaling variable τk represents the normalized time in [0, 1] for each subinterval [tk, tk+1]. □(τk) B□(skτk+tk), where □ is a placeholder for any time-varying variable, for brevity. Equation 27 can be equivalently expressed with respect to $\tau^k \in [0, 1]$ as $$x(\tau^k) = x_k + \int_0^{\tau_k} s_k f(x(\tau^k), u(\tau^k))d\tau^k.$$

As discussed earlier, certain aspects and features of the present disclosure can involve linearizing all nonconvex constraints around a reference trajectory, which is either the solution to the subproblem at the previous iteration or the initial guess trajectory 302. The reference trajectory consists of the state profile x¯k and the control input profile u¯k for all k∈N0N, and the time-interval dilation variable s¯k for all k∈N0N−1 that will be denoted together as {x¯k, u¯k, s¯k} for notational simplicity. Similarly, {xk, uk, sk} denotes the solution trajectory at the current iteration.

To ensure continuity of the state trajectory x(τk) at each discrete-time node, the computing device 104 may impose the following continuity constraint for all k∈N0N.

$$x_{k+1} = x(\tau_{k+1}), \tag{29a}$$

$$= x_k + \lim_{\tau \to \tau_{k+1}} \int_{\tau_k}^{\tau} s_k f(x(\tau), u(\tau)) d\tau, \tag{29b}$$

With first-order hold interpolation (26), the right-hand side of (29b) is a nonconvex function of xk, uk, uk+1, sk, and evaluating this function involves solving the ordinary differential equation (ODE). To impose the continuity constraint in the SCP framework, the computing device 104 may linearize the constraint with respect to the reference trajectory {x¯k, u¯k, s¯k}. One way to linearize (29) is to use the variational method that employs the sensitivity equation given as the variational differential equation along the reference trajectory. Then, the linearization of the dynamics constraint (29) yields:

$$x_{k+1} = A_k x_k + B_k^m u_k + B_k^p u_{k+1} + z_k s_k + w_k, \tag{30}$$

With $$A_k \in \mathbb{R}^{n_x x n_x} + B_k^m, B_k^p \in \mathbb{R}^{n_x x n_u} + z_k \in \mathbb{R}^{n_x} + w_k \in \mathbb{R}^{n_x},$$

The state and input constraints given in (8)-(13) may be convex constraints, and as a result, it may not be necessary to linearize them. The state and input constraints can be imposed at each node point as follows:

$$-(p_D)_k \geq 0 - (p_D)_k \geq 0, \tag{31a}$$

$$v_{min} \leq v_k \leq v_{max}, \phi_{min} \leq \phi_k \leq \phi_{max}, \tag{31b}$$

$$\theta_{min} \leq \theta_k \leq \theta_{max}, \Omega_{min} \leq \Omega_k \leq \Omega_{max}, \tag{31c}$$

$$(u_a)_k \tan\alpha_{min} \leq (w_a)_k \leq (u_a)_k \tan\alpha_{max}, u_{min} \leq u_k \leq u_{max} \tag{31d}$$

$$\delta_T, \min \leq (\delta_T)k \leq \delta_T, \max, \dot{\delta}_{min} \leq \frac{1}{\tau_T}((\eta\tau)_k - (\delta_T)_k) \leq \dot{\delta}_{max}. \tag{31e}$$

As mentioned earlier, the runway alignment constraint derived in (16) involves the existential quantifier for the switching time ts. To incorporate this in the finite-dimensional optimization framework, the computing device 104 may first specify a node point ks such that the time at the node may be equal to the switching time, i.e., ts:=tks. Then, the runway alignment constraint can be represented as:

$$-(P_D)_k \leq h_c \text{ and } c(p_k) \leq 0, \forall\, k \in N_{k_s}^N \tag{32}$$

The computing device 104 may impose an alignment condition starting at $k_s$-th node, and is imposed at all succeeding nodes. Note that although node point corresponding to $k_s$ is determined in advance, the switching time itself is not predetermined. Instead, the switching time is obtained by solving the optimization problem because the time-interval dilation variable $s_k$ is treated a decision variable. The switching time can be represented in terms of $t_{ks}$ and $s_k$ as $$t_s := t_{k_s} = \sum\nolimits_{k=0}^{k_s} s_k.$$

By imposing constraint (32), we can guarantee that there exists a time after which the alignment condition is activated, thereby satisfying the original runway alignment constraint (16). It is also worth noting that the constraint (32) is convex, and hence will not be linearized.

Additionally, the computing device 104 can utilize uniform meshes for each base leg phase and final approach phase. To be more specific, all nodes from the start to ks−1 have identical time-interval dilation values sk, that is:

$$s_i = s_j, \forall\, i, j \in N_0^{k_s - 1} \tag{33}$$

The computing device 104 can use Equation 33 to maintain a uniform mesh during the base leg phase. Similarly, all nodes from ks to N−1 also share the same sk values:

$$s_i = s_j, \forall\, i, j \in N_{k_s}^{N-1} \tag{34}$$

This ensures uniformity during the final approach phase. These constraints (33)-(34) help to improve the convergence behavior by restricting the solution space.

Since the runway alignment constraint given by the STC in (19) and the obstacle avoidance constraint in (21) are nonconvex, they need to be linearized. The linear approximation of the runway alignment STC may be given as follows:

$$g(p) \approx \begin{cases} g(\overline{p}_k) + \dfrac{\partial g}{\partial p} \mid \overline{p}_k (P_k - P_k) & \text{if } -\overline{p}_D < \overline{h}_c \\ 0, & \text{otherwise,} \end{cases} \forall\, k \in N_0^N \tag{35}$$

where $\overline{p}_k \in \mathbb{R}^3$ is the position component of the reference state vector $\overline{x}_k$. The obstacle avoidance constraint is linearized as follows:

$$1 - \|H_i(\overline{p}_k - r_i)\|_2 - \frac{H_i^T H_i(\overline{p}_k - r_i)}{\|H_i(\overline{p}_k - r_i)\|_2}(p_k - \overline{p}_k) \leq 0, \tag{36}$$
$$\forall\, i \in N_1^{n_{obs}}, \forall\, k \in N_0^N$$

Enforcing constraints only at the node points does not guarantee their satisfaction in the subinterval between the node points, thereby leading to the inter-sample constraint violation. Therefore, the computing device 104 can define a vector-valued function h representing constraints that need to be satisfied in continuous-time. Specifically, the computing device 104 may focus on constraints related to roll and pitch angles. Violations of these constraints within a subinterval can lead to highly erratic and undesirable aircraft motion, unlike the other constraints in (31). The computing device 104 can define the function h: Rnx→Rnh as $$h(x(t)) := \begin{bmatrix} \phi - \phi_{min} \\ \phi_{max} - \phi \\ \theta - \theta_{min} \\ \theta_{max} - \theta \end{bmatrix} h(x(t)) := \begin{bmatrix} \phi - \phi_{min} \\ \phi_{max} - \phi \\ \theta - \theta_{min} \\ \theta_{max} - \theta \end{bmatrix} \tag{37}$$

With nh=4. Given the continuously differentiable function h and the continuous-time state solution x(·), the following two expressions are equivalent [45]:

$$h(x(t)) \le 0, \forall t \in [t_k, t_{k+1}] \leftrightarrow \int_{t_k}^{t_{k+1}} \max\{h(x(t)), 0\}^2 dt = 0 \tag{38}$$

Equation 38 shows that the pointwise inequality constraint in terms of time t can be equivalently written as a single equality constraint with the integral representation. Using this equivalence, the computing device 104 may impose the following constraint:

$$\int_{t_k}^{t_{k+1}} \max\{h(x(t)), 0\}^2 dt = 0, \quad \forall k \in N_0^{N-1} \tag{39}$$

The nonconvex constraint (39) can be linearized via the variational method, as applied to (30). After linearization, with $$\overline{A}_k \in \mathbb{R}^{n_x \times n_x} + \overline{B}_k^m, \overline{B}_k^p \in \mathbb{R}^{n_x \times n_x} + \overline{z}_k \in \mathbb{R}_x^n \text{ and } \overline{w}_k \in \mathbb{R}_x^n \; \overline{A}_k x_k + \overline{B}_k^m u_k + \overline{B}_k^p u_{k+1} + \overline{z}_k s_k + \overline{w}_k = 0, \quad \forall k \in N_0^{N-1} \tag{40}$$

As shown in block 308, virtual control terms and a trust region penalty may be incorporated to prevent artificial infeasibility, wherein the convex subproblem may be rendered infeasible even if the original nonconvex problem may be feasible, and artificial unboundedness, wherein the subproblem cost function is unbounded from below. The virtual controls vd∈Rnx and vkc∈Rnh are additional terms added to the linearized dynamics constraint (30) and the continuous time constraints (40), respectively, as follows:

$$x_{k+1} = A_k x_k + B_k^m u_k + B_k^p u_{k+1} + z_k s + w_k + v_k^d, \quad \forall k \in N_0^{N-1}, \tag{41}$$

$$0 = \overline{A}_k x_k + \overline{B}_k^m u_{k+1} + \overline{z}_k s_k + \overline{w}_k + v_k^c, \quad \forall k \in N_0^{N-1}. \tag{42}$$

This modification with the virtual control terms ensures that the subproblem is feasible. However, for the solution to be feasible with respect to the original nonlinear dynamics, the value of these terms should go to zero as the solution converges. To encourage this behavior, the computing device 104 may impose the following penalty terms:

$$J_{vc} = \sum_{k=0}^{N} \| v_k^d \|_1 + \| v_k^c \|_1 \tag{43}$$

The trust region penalty may be set as follows:

$$J_{tr} = \sum_{k=0}^{N} \| x_k - x_k \|_2^2 + \| u_k - \overline{u}_k \|_2^2 + |s_k - \overline{s}_k|^2 \tag{44}$$

The trust region penalty plays a role in keeping the solution in the vicinity of the reference trajectory around which the system is linearized, to ensure that the subproblem cost is not unbounded. Then, the conditions $J_{vc} \approx 0$ and $J_{tr} \approx 0$ are included in the stopping criteria, which will be discussed in the following subsection.

The cost functions for the final time and the thrust command in equation (22) are defined as follows:

$$J_{time}^d = \sum_{k=0}^{N-1} s_k, \; J_{thr}^d = \sum_{k=0}^{N} (\eta T)_k^2 \tag{45}$$

Next, the computing device 104 may consider the cost function for the rate of the control input commands in (23). Since the control input command rates δ¤A, δ¤E, and δ¤R may not be explicitly treated as control inputs, penalize the change of the input commands, δA, δE, and δR, as follows:

$$J_r^d = \sum_{k=0}^{N-1} ((\delta_A)_{k+1} - (\delta_A)_k)^2 + ((\delta_E)_{k+1} - (\delta_E)_k)^2 + ((\delta_R)_{k+1} - (\delta_R)_k)^2 \quad J_r^d = \sum_{k=0}^{N-1} ((\delta_A)_{k+1} - (\delta_A)_k)^2 + ((\delta_E)_{k+1} - (\delta_E)_k)^2 + ((\delta_R)_{k+1} - (\delta_R)_k)^2 \tag{46)(46}$$

Finally, the cost function for the angular velocity may be:

$$J_\Omega^d = \sum_{k=0}^{N} p_k^2 + q_k^2 + r_k^2 \tag{47}$$

The overall objective function for the convex subproblem, based on (43)-(47), may be formulated as:

$$J^d = w_t J_{time}^d + w_{thr} J_{thr}^d + w_r J_r^d + w_\Omega J_\Omega^d + w_{vc} J_{vc} + w_{tr} J_{tr}, \tag{48}$$

where wvc∈R++ and wtr∈R++ are weights for the virtual control and trust region penalties, respectively. Let {x^k, u^k, s^k} be the solution obtained by solving a convex subproblem. Then, the extrapolation step may be used to update the solution as follows:

$$x_k = \bar{x}_k + \gamma(\hat{x}_k - \bar{x}_k), \quad \forall k \in N_0^N \tag{49a}$$

$$u_k = \bar{u}_k + \gamma(\hat{u}_k - \bar{u}_k), \quad \forall k \in N_0^N \tag{49b}$$

$$s_k = \bar{s}_k + \gamma(\hat{s}_k - \bar{s}_k), \quad \forall k \in N_0^{N-1} \tag{49c}$$

where $\gamma \geq 1$ is an extrapolation parameter. With (49), the computing device may not merely accept the solution to the subproblem. Instead, the computing device 104 may obtain the solution {xk, uk, sk} at the current solution by extrapolating the current subproblem solution {x^k, u^k, s^k} based on the reference solution {x¯k, u¯k, s¯k}. The initial trajectory guess may be a user-specified trajectory that need not be dynamically feasible. The initial trajectory guess is used as a reference trajectory at the first iteration. The typical approach is to use a straight-line guess obtained by linearly interpolating between the initial and final boundary points. Here, the computing device 104 may employ the straight-line interpolation approach to construct the initial guess for the state and control input trajectory x¯k, u¯k as follows:

$$\bar{x}_k = \frac{N-k}{N}\bar{x}_i + \frac{k}{N}\bar{x}_{kf}, \bar{x}_k = \frac{N-k}{N}\bar{x}_i + \frac{k}{N}\bar{x}_{kf}, \tag{50a}$$

$$\bar{u}_k = \bar{u}_i, \quad \forall k \in N_0^N, \bar{u}_k = \bar{u}_i, \quad \forall k \in N_0^N, \tag{50b}$$

where the vectors x¯i and x¯f are (pi, vi, Φi, Ωi) and (0, vf, @f, 0), respectively, and u¯i∈R4 may be the constant control input vector. Additionally, it may be also necessary to set the initial guess for the time-interval dilation variable s¯k. For instance, one can choose the following value:

$$\bar{s}_k = \frac{s_T}{N-1,}, \bar{s}_T = \frac{\|P_i\|2}{2\|v_{min}\|_2,} + \frac{\|P_i\|2}{2\|v_{max}\|_2,} \tag{51}$$

where s¯T represents the average of the flight-times considering minimum speed and maximum speed in a straight line between the initial point and the final point.

One particular example implementation of the optimization method 300 is outlined in the code snippet below:

```
1:  Initialize {x¯ k, u¯ k, s¯ k} by (50)-(51)
2:  for i = 1, . . . , Nmax do
3:    Compute {Ak, Bmk , Bkp, zk, wk} and {A¯ k, B¯ mk ,
      B¯ kp, z¯ k, w¯ k}
4:    Compute {x^k, u^k , s^k} by solving convex subproblem
5:    Compute {xk, uk, sk} via the extrapolation step in (49)
6:    if Jvc < εvc and Jxtr < εtr then
7:      break
8:    end if
9:    Update {x¯ k, u¯ k, s¯ k} ← {xk, uk, sk}
10: end for
11: return {xk, uk, sk}
```

Prior to running the optimization method, the computing device 104 may generate an initial guess trajectory. Alternatively, the computing device 104 may receive the initial guess trajectory from a user. In some examples, the optimization method may be the sequential convex programming optimization method 300 described in FIG. 3. The optimization method can start with the generation of an initial guess trajectory {x¯k, u¯k, s¯k}. Then linearization and discretization are performed to obtain {Ak, Bmk, Bp, zk, wk} and {A¯k, B¯m, B¯kp, z¯k, w¯ k}. Next, the computing device 104 solves the convex subproblem to obtain: {x^k, u^k, s^k}. The extrapolation step computes the updated solution {xk, uk, sk}. The termination criteria to determine convergence of the solution is set as {(Jvc<εvc) and (Jxtr<εtr)}, where εvc, εtr∈R++ are user-specified tolerances for the virtual controls and the trust region, respectively. This procedure can be repeated until the termination criterion is satisfied or the iteration count reaches the maximum defined value Nmax∈R++. To solve the convex subproblem the computing device can use a solver or convex optimizer using a parser interface in a programming language, such as Python.

FIG. 4 is a flow diagram of a process 400 for generating trajectory data for an aircraft having six degrees of freedom according to certain aspects of the present disclosure. The process 400 may be executed computing device 104 discussed in the previous figures. The process 400 may make use of the optimization method 300 described in the previous figure.

At block 402 of the process 400, the computing device may model aircraft dynamics associated with the aircraft. Modelling the aircraft dynamics associated may involve generating a space-state model, such as the space-state model shown in equation (7). The computing device may model the aircraft dynamics by generating rotational and translational equations of motion that can describe the motion of the aircraft.

At block 404 of the process 400, the computing device may receive one or more operational constraints. The operational constraints can include the aircraft dynamics, and when imposed, may require that a generated trajectory satisfies the equation(s) of motion associated with the aircraft. The aircraft dynamics can be expressed using equation (41). The operational constraints can include state constraints. Examples of state constraints can include limitations on altitude, airspeed, roll angle, pitch angle, yaw, or any other state variable associated with the aircraft. The state constraints can be expressed using equation (31). In some examples, the operational constraints can include a runway alignment constraint, as shown in equations (32) and (35). The runway alignment constraint can ensure that the aircraft is aligned with the runway during takeoff and/or landing. The operational constraints can include a time mesh uniformity constraint as shown in equations (33) and (34) that can ensure equally spaced intervals of time between discrete sample points in the trajectory data. In some examples, the operational constraints may include an obstacle avoidance constraint as shown in equation (36) to enable the aircraft to avoid collision with obstacles such as contrails, structures, or other aircraft. The operational constraints may also include a continuous time constraint as shown in equation (42) to prevent inter-sample constraint violations in the trajectory data. In some examples, the operational constraints may state triggered constraints that may be enforced based on the temporal state parameters.

At block 406 of the process 400, the computing device may generate an initial guess trajectory. In some examples, the computing device 104 may implement a conventional trajectory generation algorithm to create an initial path between a takeoff location and landing location as a reference trajectory. The reference trajectory may not satisfy the operational constraints 102 and may be iteratively adjusted to do so during optimization.

At block 408 of the process 400, the computing device may iteratively perform an optimization method (e.g., the optimization method 300) subject to the operational constraints to obtain trajectory data associated with the aircraft.

The optimization method may involve formulating an optimal control problem for the aircraft and converting the optimal control problem into one or more convex sub-problems. The optimization method may involve solving the one or more convex sub-problems to determine the trajectory data. For example, to generate the trajectory data, the computing device may minimize equation (44) subject to one or more of the aforementioned operational constraints. In some examples, the trajectory data may be a series of vectors, tensors, matrices, or any other data structures suitable for containing the trajectory data. The trajectory data can include temporal state parameters and control input signals associated with the aircraft. The temporal state parameters can include a position of the aircraft, a velocity of the aircraft, one or more Euler angles of the aircraft, an angular velocity of the aircraft, a thrust associated with the aircraft, or any combination thereof. The control input signals may include an aileron command, an elevator command, a rudder command, a thrust command, or any combination thereof. In some examples, the optimization method may be a sequential convex programming method, such as an extrapolated penalized trust region method.

At block 410 of the process 400, the computing device may transmit the trajectory data to a flight computer. The flight computer may receive the trajectory data and issue commands to control the aircraft based on the trajectory data.

Figure 5:
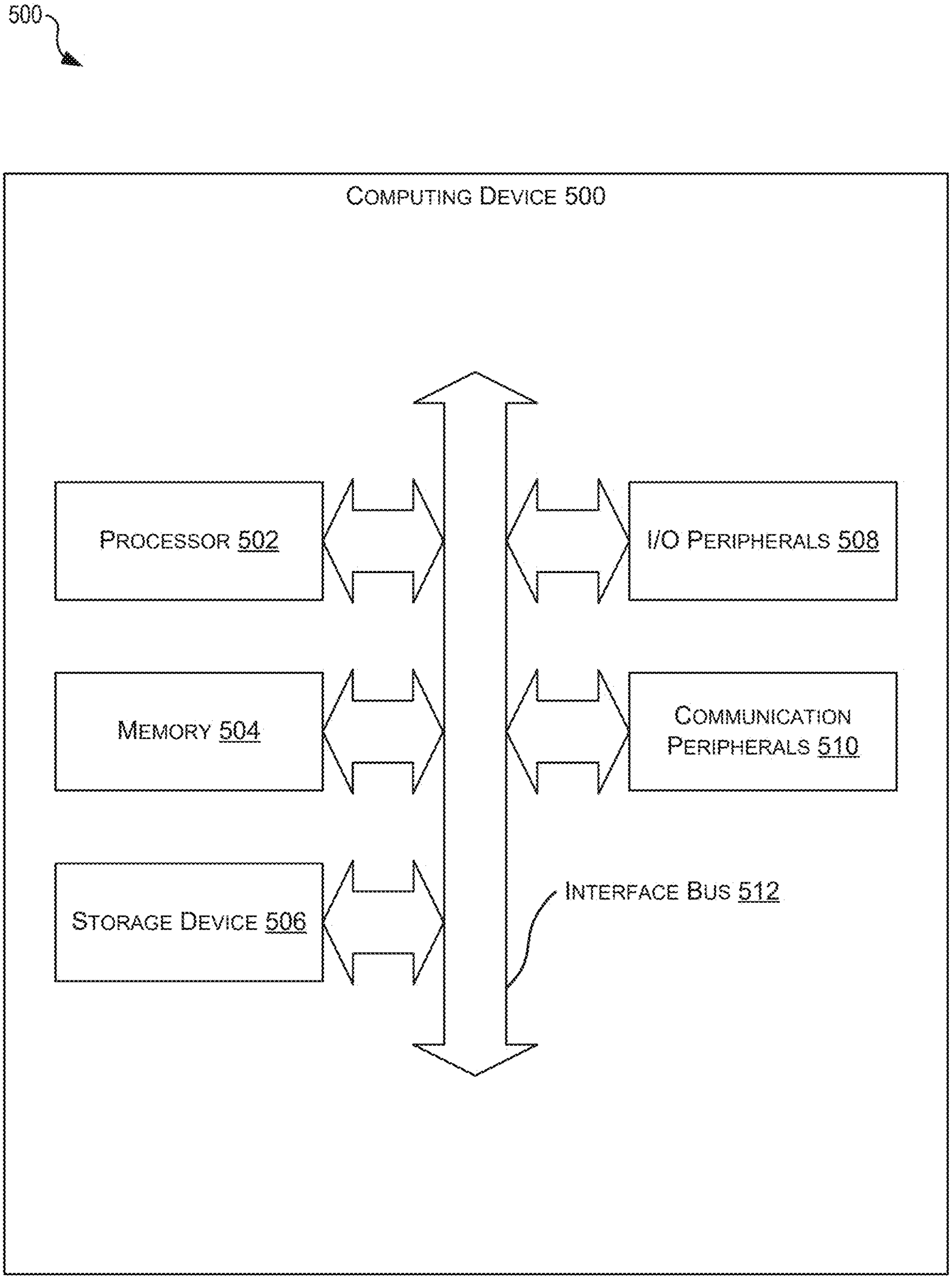
FIG. 5 is a block diagram for a computing device for generating trajectory data for an aircraft having six degrees of freedom according to certain aspects of the present disclosure.

FIG. 5 is a block diagram for a computing device for generating trajectory data for an aircraft having six degrees of freedom according to certain aspects of the present disclosure.

The computer system 500 can be used as a node in a computer network, where this node provides one or more computing components of an underlay network of the computer network and/or one or more computing components of an overlay network of the computer network. Additionally or alternatively, the components of the computer system 500 can be used in an endpoint. Although the components of the computer system 500 are illustrated as belonging to a same system, the computer system 500 can also be distributed (e.g., between multiple user devices). The computer system 500 may be the same as the computing device 104, and may be capable of performing an optimization method to generate trajectory data for an aircraft having six degrees of freedom.

The computer system 500 can include at least a processor 502, a memory 504, a storage device 506, input/output peripherals (I/O) 508, communication peripherals 510, and an interface bus 512. The interface bus 512 is configured to communicate, transmit, and transfer data, controls, and commands among the various components of the computer system 500. The memory 504 and the storage device 506 include computer-readable storage media, such as RAM, ROM, electrically erasable programmable read-only memory (EEPROM), hard drives, CD-ROMs, optical storage devices, magnetic storage devices, electronic non-volatile computer storage; for example, Flash® memory, and other tangible storage media. Any of such computer-readable storage media can be configured to store instructions or program codes embodying aspects of the disclosure. The memory 504 and the storage device 506 also include computer-readable signal media. A computer-readable signal medium includes a propagated data signal with computer-readable program code embodied therein. Such a propagated signal takes any of a variety of forms including, but not limited to, electromagnetic, optical, or any combination thereof. A computer-readable signal medium includes any computer-readable medium that is not a computer-readable storage medium and that can communicate, propagate, or transport a program for use in connection with the computer system 500.

Further, the memory 504 includes an operating system, programs, and applications. The processor 502 is configured to execute the stored instructions and includes, for example, a logical processing unit, a microprocessor, a digital signal processor, and other processors. The memory 504 and/or the processor 502 can be virtualized and can be hosted within another computer system of, for example, a cloud network or a data center. The I/O peripherals 508 include user interfaces, such as a keyboard, screen (e.g., a touch screen), microphone, speaker, other input/output devices, and computing components, such as graphical processing units, serial ports, parallel ports, universal serial buses, and other input/output peripherals. The I/O peripherals 508 are connected to the processor 502 through any of the ports coupled to the interface bus 512. The communication peripherals 510 are configured to facilitate communication between the computer system 500 and other systems over a communications network and include, for example, a network interface controller, modem, wireless and wired interface cards, antenna, and other communication peripherals.

The computer system 500 can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices, such as random-access memory ("RAM") or read-only memory ("ROM"), as well as removable media devices, memory cards, and/or flash cards.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions, and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computing systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z).

Thus, such disjunctive language is not generally intended to, and should not, imply that certain examples require at least one of X, at least one of Y, or at least one of Z to each be present.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and all three of A and B and C.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising:
- a processing device; and
- a memory having instructions that are executable by the processing device for causing the processing device to:
  - receive or determine one or more operational constraints corresponding to an aircraft having multiple degrees of freedom;
  - generate a reference trajectory between a takeoff location and a landing location;
  - perform an optimization method by:
    - determining that the reference trajectory does not meet an operational constraint of the one or more operational constraints;
    - responsive to determining that the reference trajectory does not meet the operational constraint, iteratively adjusting a temporal state parameter of the reference trajectory until a set of trajectory data corresponding to an adjusted trajectory meets the one or more operational constraints, wherein the set of trajectory data comprises:
      - a set of temporal state parameters that describe a state of the aircraft along the adjusted trajectory; and
      - a set of control input signals that are usable to control the aircraft to execute the set of temporal state parameters; and
  - transmit the set of trajectory data to a flight computer, the flight computer being configured to control the aircraft along the adjusted trajectory based on the set of trajectory data.

2. The system of claim 1, wherein the optimization method further comprises:
- formulating an optimal control problem for the aircraft;
- converting the optimal control problem into one or more convex sub-problems; and
- solving the one or more convex sub-problems to determine the set of trajectory data.

3. The system of claim 1, wherein the aircraft comprises at least six degrees of freedom.

4. The system of claim 1, wherein the flight computer is configured to execute the set of control input signals by executing at least one of:
- an aileron command;
- an elevator command;
- a rudder command; or
- a thrust command associated with the aircraft.

5. The system of claim 1, wherein performing the optimization method further comprises performing a sequential convex programming (SCP) method.

6. The system of claim 5, wherein performing the sequential convex programming method further comprises performing an extrapolated penalized trust region (xPTR) method.

7. The system of claim 1, wherein the one or more operational constraints comprise one or more state-triggered constraints that are configured to be enforced based on the set of temporal state parameters.

8. A computer-implemented method comprising:
- receiving or determining one or more operational constraints corresponding to an aircraft having multiple degrees of freedom;
- generating a reference trajectory between a takeoff location and a landing location;
- performing an optimization method by:
  - determining that the reference trajectory does not meet an operational constraint of the one or more operational constraints;
  - responsive to determining that the reference trajectory does not meet the operational constraint, iteratively adjusting a temporal state parameter of the reference trajectory until a set of trajectory data corresponding to an adjusted trajectory meets the one or more operational constraints, wherein the set of trajectory data comprises:
    - a set of temporal state parameters that describe a state of the aircraft along the adjusted trajectory; and
    - a set of control input signals that are usable to control the aircraft to execute the set of temporal state parameters; and
- transmitting the set of trajectory data to a flight computer that is configured to control the aircraft along the adjusted trajectory based on the set of trajectory data.

9. The method of claim 8, further comprising accessing a set of modeled dynamics for the aircraft.

10. The method of claim 9, wherein the one or more operational constraints comprise the set of modeled dynamics for the aircraft.

11. The method of claim 8, wherein the one or more operational constraints comprise a runway alignment constraint.

12. The method of claim 8, wherein the one or more operational constraints comprise an obstacle avoidance constraint.

13. The method of claim 8, wherein the one or more operational constraints comprise a continuous time constraint that is configured to prevent inter-sample constraint violations.

14. The method of claim 8, wherein the one or more operational constraints comprise one or more limits on the set of control input signals.

15. A non-transitory computer-readable medium having instructions that are executable by a processing device for causing the processing device to:
- receive one or more operational constraints corresponding to an aircraft having multiple degrees of freedom;
- generate a reference trajectory between a takeoff location and a landing location;

perform an optimization method by:

determining that the reference trajectory does not meet an operational constraint of the one or more operational constraints;

responsive to determining that the reference trajectory does not meet the operational constraint, iteratively adjusting a temporal state parameter of the reference trajectory until a set of trajectory data corresponding to an adjusted trajectory meets the one or more operational constraints, wherein the set of trajectory data comprises:

a set of temporal state parameters that describe a state of the aircraft along the adjusted trajectory; and a set of control input signals that are usable to control the aircraft to execute the set of temporal state parameters; and transmit the set of trajectory data to a flight computer, the flight computer being configured to control the aircraft along the adjusted trajectory based on the set of trajectory data.

16. The non-transitory computer-readable medium of claim 15, wherein the instructions are further executable by the processing device to determine the one or more operational constraints based on a six degree-of-freedom computational model of the aircraft.

17. The non-transitory computer-readable medium of claim 15, wherein the set of temporal state parameters comprises at least one of:

a position of the aircraft;

a velocity of the aircraft;

one or more Euler angles associated with an angular orientation of the aircraft;

an angular velocity of the aircraft; or an actual thrust associated with the aircraft.

18. The non-transitory computer-readable medium of claim 15, wherein the flight computer is configured to execute the set of control input signals by executing at least one of:

an aileron command;

an elevator command;

a rudder command; or a thrust command associated with the aircraft.

19. The non-transitory computer-readable medium of claim 15, wherein the optimization method further comprises performing a sequential convex programming (SCP) method.

20. The non-transitory computer-readable medium of claim 19, wherein performing the sequential convex programming method further comprises performing an extrapolated penalized trust region (xPTR) method.

* * * * *